(12) United States Patent
Lee et al.

(10) Patent No.: US 10,903,479 B2
(45) Date of Patent: Jan. 26, 2021

(54) APPARATUS FOR MANUFACTURING ELECTRODE OR SOLID ELECTROLYTE FOR ALL-SOLID-STATE BATTERY

(71) Applicant: LG Chem, Ltd., Seoul (KR)

(72) Inventors: Sang-Kyun Lee, Daejeon (KR); Min-Wook Kim, Daejeon (KR); Baeck-Boem Choi, Daejeon (KR); Cha-Hun Ku, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/546,512

(22) Filed: Aug. 21, 2019

(65) Prior Publication Data

US 2020/0067068 A1 Feb. 27, 2020

(30) Foreign Application Priority Data

Aug. 24, 2018 (KR) .................. 10-2018-0099234

(51) Int. Cl.
*H01M 4/04* (2006.01)
*H01M 10/0562* (2010.01)
*H01M 10/0525* (2010.01)
*H01M 10/0585* (2010.01)

(52) U.S. Cl.
CPC ..... *H01M 4/0409* (2013.01); *H01M 10/0525* (2013.01); *H01M 10/0562* (2013.01); *H01M 10/0585* (2013.01)

(58) Field of Classification Search
CPC .................. H01M 4/0409; H01M 10/0562
See application file for complete search history.

(56) References Cited

U.S. PATENT DOCUMENTS

| | | | |
|---|---|---|---|
| 2005/0236732 A1* | 10/2005 | Brosch | B29C 43/22 264/210.2 |
| 2009/0325045 A1* | 12/2009 | Miyahisa | H01M 4/1391 429/94 |
| 2013/0004844 A1* | 1/2013 | Hosoe | C22C 1/08 429/211 |
| 2018/0290441 A1* | 10/2018 | Adachi | H01M 4/881 |

FOREIGN PATENT DOCUMENTS

| | | | | |
|---|---|---|---|---|
| CN | 207263145 U | * | 4/2018 | |
| JP | S58-097268 A | | 6/1983 | |
| JP | 10012224 A | * | 1/1998 | |
| JP | 11067229 A | * | 3/1999 | ............. H01M 6/02 |
| JP | 2006-134611 A | | 5/2006 | |
| JP | 5411371 B1 | | 2/2014 | |

(Continued)

*Primary Examiner* — Jonathan G Jelsma
(74) *Attorney, Agent, or Firm* — Lerner, David, Littenberg, Krumholz & Mentlik, LLP

(57) ABSTRACT

Disclosed is an apparatus for manufacturing an electrode or a solid electrolyte for an all-solid-state battery. The apparatus for manufacturing an electrode or a solid electrolyte for an all-solid-state battery includes a first roller member configured to press an electrode or a solid electrolyte for an all-solid-state battery, and a second roller member located to be spaced apart from the first roller member to press the electrode or the solid electrolyte for an all-solid-state battery. The first roller member and the second roller member are disposed at opposite locations based on the electrode or the solid electrolyte for an all-solid-state battery.

8 Claims, 4 Drawing Sheets

(56) References Cited

FOREIGN PATENT DOCUMENTS

| | | | |
|---|---|---|---|
| JP | 2015-118870 A | 6/2015 | |
| KR | 10-2004-0029003 A | 4/2004 | |
| KR | 10-2005-0098886 A | 10/2005 | |
| KR | 10-2015-0082802 A | 7/2015 | |
| KR | 10-2016-0039805 A | 4/2016 | |
| KR | 10-2017-0050562 A | 5/2017 | |
| KR | 20170049583 A * | 5/2017 | .......... H01M 4/0404 |
| KR | 10-2018-0023185 A | 3/2018 | |

* cited by examiner

APPARATUS FOR MANUFACTURING ELECTRODE OR SOLID ELECTROLYTE FOR ALL-SOLID-STATE BATTERY

CROSS-REFERENCE TO RELATED APPLICATIONS

The present application claims priority to Korean Patent Application No. 10-2018-0099234 filed on Aug. 24, 2018, the disclosures of which are incorporated herein by reference.

TECHNICAL FIELD

The present disclosure relates to an apparatus for manufacturing an electrode or a solid electrolyte for an all-solid-state battery, and more particularly, to an apparatus for manufacturing an electrode or a solid electrolyte for an all-solid-state battery, which may prevent a crack from being generated at the electrode or the solid electrolyte.

BACKGROUND ART

Various batteries capable of overcoming the existing limitations of a lithium secondary battery are being studied in terms of battery capacity, safety, output, enlargement, and miniaturization.

Representatively, as alternatives of the existing lithium secondary battery, researches are being continuously performed in the academic and industrial fields about a metal-air battery having a very large theoretical capacity in terms of capacity, an all-solid-state battery with no risk of explosion in terms of safety, a supercapacitor in terms of output, a NaS battery or a redox flow battery (RFB) in terms of enlargement, and a thin film battery in terms of miniaturization.

The all-solid-state battery refers to a battery in which a liquid electrolyte used in the existing lithium secondary battery is replaced with a solid. The all-solid-state battery may have greatly improved safety since a combustible solvent is not used in the battery and thus no ignition or explosion occurs due to the decomposition reaction, different from a conventional electrolyte. In addition, since Li metal or Li alloy may be used as a negative electrode material, an energy density with respect to mass and volume of the battery may be remarkably improved.

The all-solid-state battery is manufactured through a dry compression process in which an electrode and a solid electrolyte are prepared in a powder state and then put into a predetermined mold and pressed, or a slurry coating process in which a slurry composition including an active material, a solvent and a binder is prepared, coated and then dried.

In the all-solid-state batteries, the characteristics of the battery depend on the porosity in the electrode and the solid electrolyte. As the porosity is closer to 0% that is an ideal target, the battery characteristics are more excellent. In order to reduce the porosity, a binder may be used. In this case, however, the binder acts as a resistor, thereby deteriorating the battery performance.

Conventionally, a rolling method using rollers is used to prepare an electrode or a solid electrolyte for an all-solid-state battery, but cracks are generated in the electrode or the solid electrolyte when the rollers press the electrode or the solid electrolyte.

RELATED LITERATURES

Patent Literature

Korean Unexamined Patent Publication No.—2017-0050562 (published on May 11, 2017)

DISCLOSURE

Technical Problem

The present disclosure is directed to providing an apparatus for manufacturing an electrode or a solid electrolyte for an all-solid-state battery, which may prevent a crack from being generated at the electrode or the solid electrolyte.

Technical Solution

In one aspect of the present disclosure, there is provided an apparatus for manufacturing an electrode or a solid electrolyte for an all-solid-state battery, the apparatus comprising: a first roller member configured to press an electrode or a solid electrolyte for an all-solid-state battery; and a second roller member located to be spaced apart from the first roller member to press the electrode or the solid electrolyte for an all-solid-state battery, wherein the first roller member and the second roller member are disposed at opposite locations based on the electrode or the solid electrolyte for an all-solid-state battery.

Also, the first roller member and the second roller member may be provided in plural, respectively, the plurality of first roller members may be disposed to be spaced apart from each other along one straight line, and the plurality of second roller members may be disposed to be spaced apart from each other along another straight line.

In addition, the plurality of first roller members disposed to be spaced apart from each other along one straight line may be provided to have different diameters from each other, or the plurality of second roller members disposed to be spaced apart from each other along another straight line may be provided to have different diameters from each other.

Also, the plurality of first roller members or the plurality of second roller members may be provided such that the diameters of the first roller members or the second roller members become smaller in a preset direction.

In addition, the apparatus may further comprise a first guide belt configured to entirely surround the plurality of first roller members or a second guide belt configured to entirely surround the plurality of second roller members.

Also, the apparatus may further comprise a first heat supply member connected to the first guide belt or the second guide belt to supply heat to the first guide belt or the second guide belt.

In addition, the apparatus may further comprise a second heat supply member spaced apart from the first guide belt or the second guide belt to supply heat to the first guide belt or the second guide belt; and a heat dispersion member disposed between the second heat supply member and the first guide belt or the second guide belt to uniformly disperse the heat supplied from the second heat supply member.

Also, the apparatus may further comprise an elastic body configured to surround the first roller member or the second roller member.

In addition, the first roller member may be provided to have a different diameter from the second roller member, which is disposed at a different location from the first roller member based on the electrode or the solid electrolyte for an all-solid-state battery.

Also, the apparatus may further comprise at least one sensing member configured to sense a thickness of the electrode or the solid electrolyte for an all-solid-state battery, which is pressed by the plurality of first roller members or the plurality of second roller members; and a control unit configured to adjust a pressing force of the plurality of first roller members or the plurality of second roller members according to the thickness of the electrode or the solid electrolyte sensed by the sensing member.

Advantageous Effects

According to the embodiments of the present disclosure, it is possible to prevent a crack from being generated at the electrode or the solid electrolyte.

BEST MODE

Figure 1:
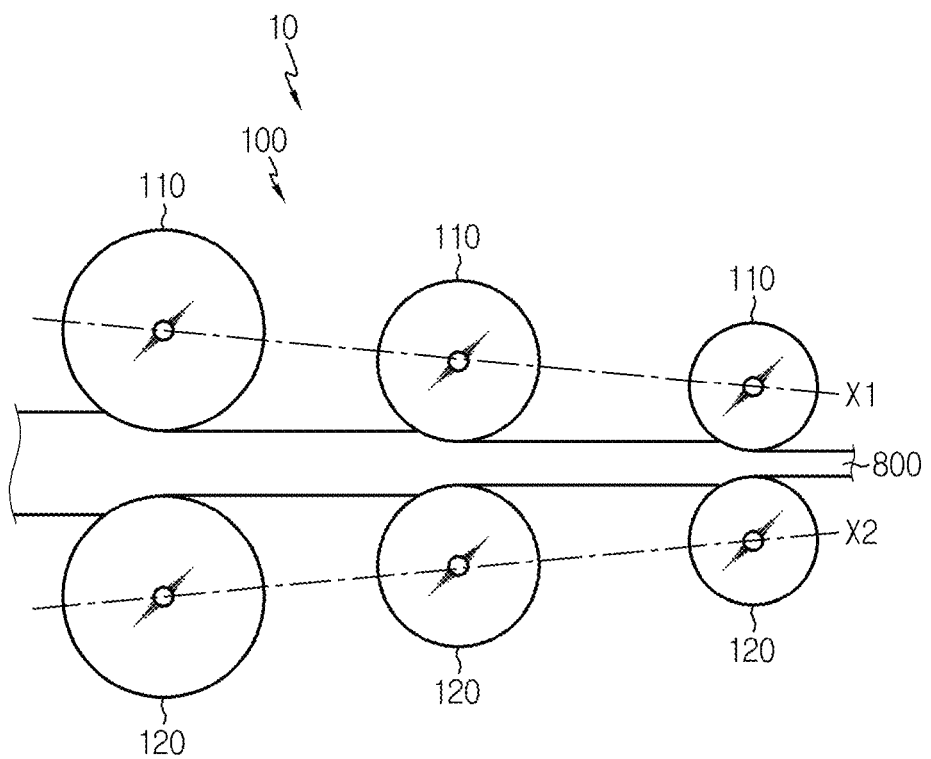
FIG. 1 is a diagram schematically showing an apparatus for manufacturing an electrode or a solid electrolyte for an all-solid-state battery according to the first embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 2:
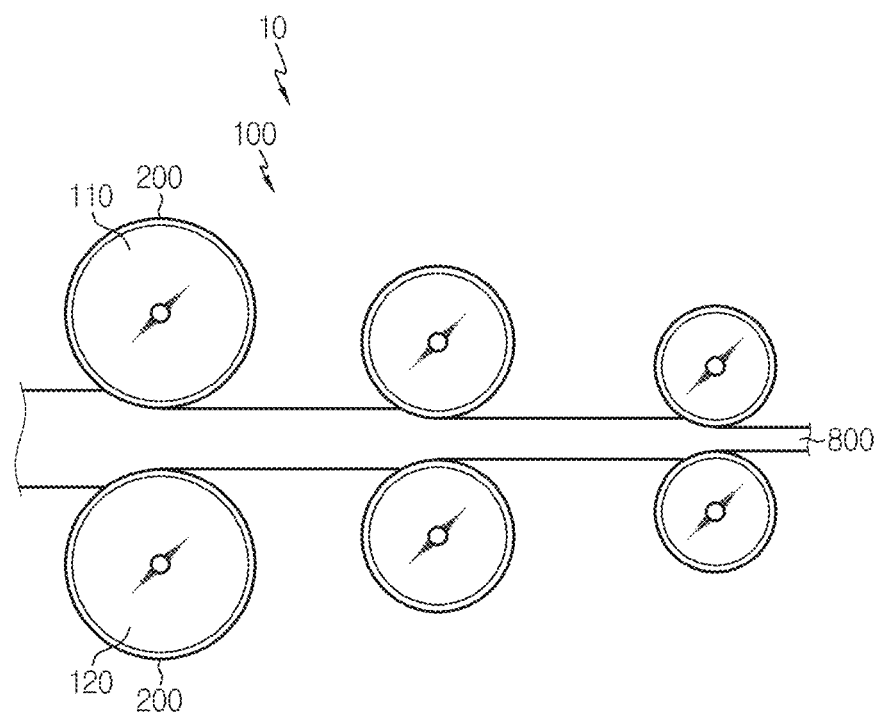
FIG. 2 is a diagram schematically showing that an elastic body is coupled to a roller member, in the apparatus for manufacturing an electrode or a solid electrolyte for an all-solid-state battery according to the first embodiment of the present disclosure.
Figure 3A:
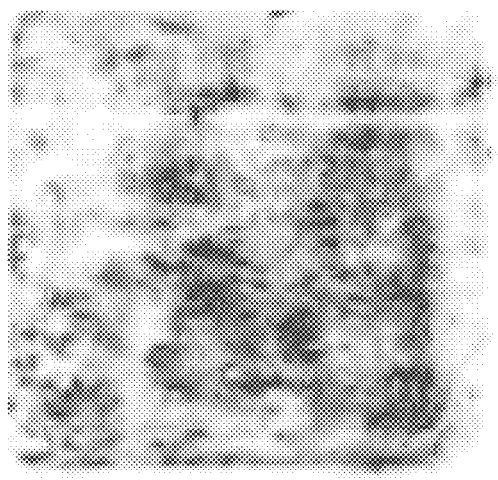
FIGS. 3A and 3B are diagrams showing a pressure dispersion at a pressing surface in a case where the elastic body of FIG. 2 is not provided and in a case where the elastic body of FIG. 2 it provided.
Figure 3B:
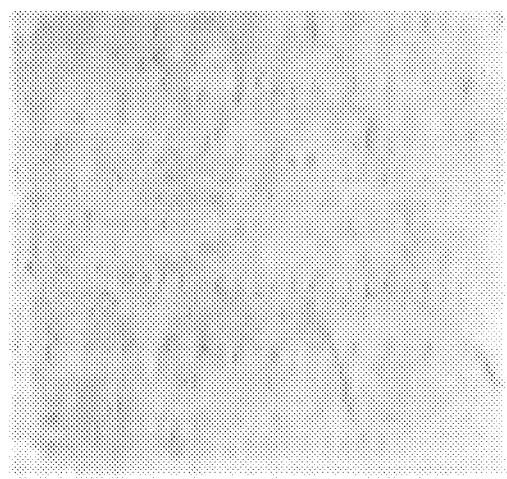
Figure 4:
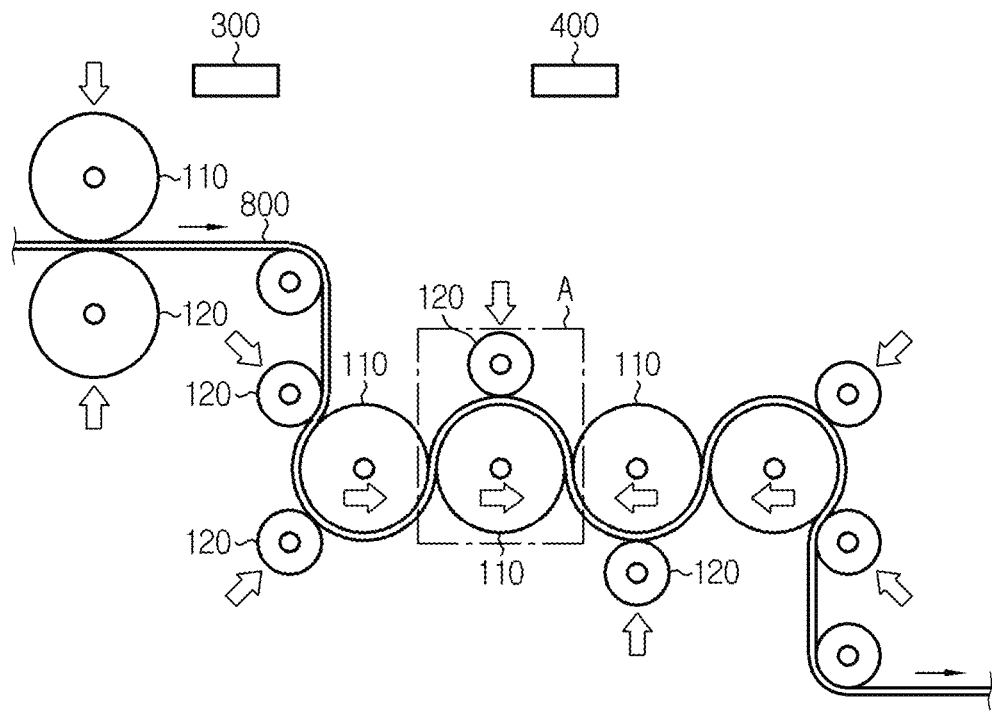
FIG. 4 shows a modified embodiment of the apparatus for manufacturing an electrode or a solid electrolyte for an all-solid-state battery according to the first embodiment of the present disclosure.
Figure 5:
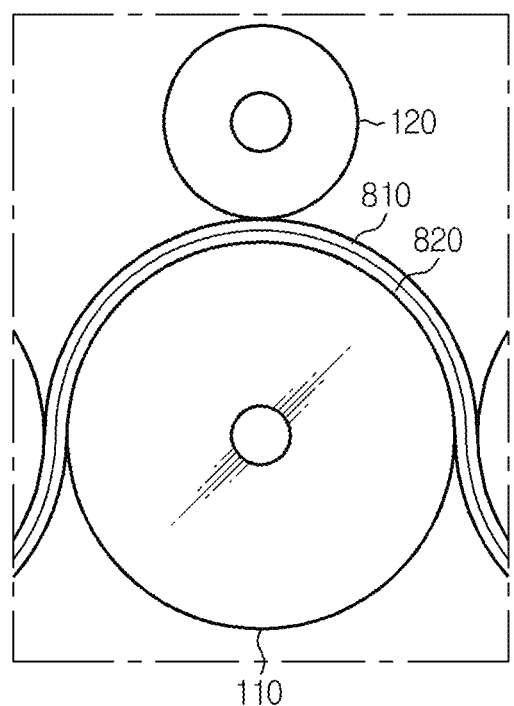
FIG. 5 is a partially enlarged view showing a portion A of FIG. 4.

FIG. 1 is a diagram schematically showing an apparatus for manufacturing an electrode or a solid electrolyte for an all-solid-state battery according to the first embodiment of the present disclosure, FIG. 2 is a diagram schematically showing that an elastic body is coupled to a roller member, in the apparatus for manufacturing an electrode or a solid electrolyte for an all-solid-state battery according to the first embodiment of the present disclosure, FIGS. 3A and 3B are diagrams showing a pressure dispersion at a pressing surface in a case where the elastic body of FIG. 2 is not provided and in a case where the elastic body of FIG. 2 is provided, FIG. 4 shows a modified embodiment of the apparatus for manufacturing an electrode or a solid electrolyte for an all-solid-state battery according to the first embodiment of the present disclosure, and FIG. 5 is a partially enlarged view showing a portion A of FIG. 4.

Referring to FIG. 1, an apparatus 10 for manufacturing an electrode or a solid electrolyte for an all-solid-state battery according to the first embodiment of the present disclosure includes a first roller member 110 and a second roller member 120.

The first roller member 110 presses an electrode or a solid electrolyte 800 for an all-solid-state battery. That is, the first roller member 110 may press the electrode for an all-solid-state battery to fabricate an electrode for an all-solid-state battery, or the first roller member 110 may press the solid electrolyte 800 for an all-solid-state battery to fabricate a solid electrolyte 800 for an all-solid-state battery. In addition, the first roller member 110 may press the electrode and the solid electrolyte together so that the electrode and the solid electrolyte are combined and joined together. Even though FIG. 1 depicts that the first roller member 110 presses the solid electrolyte 800, a target pressed by the first roller member 110 may be an electrode, which is also the same in the following description. In addition, the electrode or the solid electrolyte 800 means an electrode or a solid electrolyte 800 used in an all-solid-state battery. The first roller member 110 may include various rotatable rollers, a rotating shaft coupled to the rollers, and a power source for rotating the rotating shaft. However, hereinafter, the first roller member 110 may mainly have the same concept as the rollers. In addition, the second roller member 120 is also understood likewise. The first roller member 110 may press the electrode or the solid electrolyte 800 while rotating. For example, as shown in FIG. 1, the first roller member 110 may be disposed at various positions, for example at an upper side of the electrode or the solid electrolyte 800 based on FIG. 1.

The second roller member 120 is located to be spaced apart from the first roller member 110 and presses the electrode or the solid electrolyte 800 for an all-solid-state battery. That is, the second roller member 120 may press the electrode for an all-solid-state battery to fabricate an electrode for an all-solid-state battery, or the second roller member 120 may press the solid electrolyte 800 for an all-solid-state battery to fabricate a solid electrolyte 800 for an all-solid-state battery. Similar to the first roller member 110, the second roller member 120 may press the electrode and the solid electrolyte together so that the electrode and the solid electrolyte are combined and joined together. The second roller member 120 includes various rotatable rollers. That is, the second roller member 120 may press the electrode or the solid electrolyte 800 while rotating. As shown in FIG. 1, the second roller member 120 may be disposed at various positions, for example at a lower side of the electrode or the solid electrolyte 800 based on FIG. 1. Meanwhile, the second roller member 120 may be disposed opposite to the first roller member 110 based on the electrode or the solid electrolyte 800 for an all-solid-state battery. That is, if the first roller member 110 presses, for example, the upper side of the electrode or the solid electrolyte 800, the second roller member 120 presses, for example, the lower side of the electrode or solid electrolyte 800. Here, the second roller member 120 may be disposed symmetrically with respect to the first roller member 110 based on the electrode or the solid electrolyte 800, without being limited thereto.

Meanwhile, one first roller member 110 and one second roller member 120 may be provided. That is, one first roller member 110 and one second roller member 120 may be disposed at the upper side and the lower side of the electrode or the solid electrolyte 800, respectively. Alternatively, a plurality of first roller members 110 and a plurality of second roller members 120 may be provided. Here, the plurality of first roller members 110 may be arranged to be spaced apart from each other along one straight line. For example, as shown in FIG. 1, three first roller members 110 may be disposed on a straight line (see X1 in FIG. 1), and the three first roller members 110 may be spaced apart from each other. In addition, the plurality of second roller members 120 may be disposed to be spaced apart from each other along another straight line (see X2 in FIG. 1) different from the straight line on which first roller members 110 are disposed. For example, as shown in FIG. 1, three second roller members 120 may be disposed on a straight line (see X2 in FIG. 1), and the three second roller members 120 may be spaced apart from each other. Here, the number of the first roller members 110 and the number of the second roller members 120 are only one example, and the number of the first roller members 110 and the number of the second roller members 120 may be variously selected. As described above, the plurality of first roller members 110 are disposed to be spaced apart from each other along one straight line, also the plurality of second roller members 120 are disposed to be spaced apart from each other along a straight line different from the straight line along which the first roller members 110 are disposed, and thus the electrode or the solid electrolyte 800 may be entirely pressed. Here, the plurality of first roller members 110 arranged to be spaced apart from each other along one straight line may be configured to have different diameters, for example such that the diameters of the first roller members 110 decrease from left to right based on FIG. 1, as shown in FIG. 1. Alternatively, the plurality of second roller members 120 arranged to be spaced apart from each other along another straight line may be configured to have different diameters, for example such that the diameters of the second roller members 120 decrease from left to right based on FIG. 1, as shown in FIG. 1. If the electrode or the solid electrolyte 800 is pressed by a plurality of roller members 100, the electrode or the solid electrolyte 800 has a smaller thickness, and thus it is advantageous that the pressure applied to prevent a crack from being generated at the electrode or the solid electrolyte 800 is reduced after the thickness is decreased. In an embodiment of the present disclosure, the diameters of the plurality of roller members 100 become smaller based on a moving direction of the electrode or the solid electrolyte 800 such that when the thickness of the electrode or the solid electrolyte 800 is decreased, the pressing force applied to the electrode or the solid electrolyte 800 is also reduced. In this way, it is possible to prevent a crack from being generated at the electrode or the solid electrolyte 800.

Referring to FIG. 2, in another embodiment, the elastic body 200 may be provided to surround at least one first roller member 110 or at least one second roller member 120, respectively. If each roller member 100 is surrounded by the elastic body 200, when the roller member 100 presses the electrode or the solid electrolyte 800, the pressing force may become uniform. That is, FIG. 3A is an enlarged view showing a pressing surface where the roller member 100 presses the electrode or the solid electrolyte 800 when the elastic body 200 is not provided, and FIG. 3B is an enlarged view showing a pressing surface where the roller member 100 presses the electrode or the solid electrolyte 800 when the elastic member 200 surrounds the roller member 100. In FIG. 3A, the pressing force provided to the electrode or the solid electrolyte 800 is not uniform. That is, a large pressing force is applied at a predetermined portion and a small pressing force is applied at another portion. However, in FIG. 3B, the pressing force applied to the electrode or the solid electrolyte 800 is almost uniform. As described above, if the roller member 100 is surrounded by an elastic material such as rubber or synthetic resin, the pressing force applied to the electrode or the solid electrolyte 800 becomes uniform, and thus components of the electrode or the solid electrolyte 800 becomes uniformly dispersed.

Referring to FIG. 4, the first roller member 110 and the second roller member 120 may be disposed at different positions based on the electrode or the solid electrolyte 800 for an all-solid-state battery. That is, based on FIG. 4, if the first roller member 110 is disposed at a right side of the electrode or the solid electrolyte 800, the second roller member 120 may be disposed at a left side of the electrode or the solid electrolyte 800. In addition, based on FIG. 4, if the first roller member 110 is disposed at a lower side of the electrode or the solid electrolyte 800, the second roller member 120 may be disposed at an upper side of the electrode or the solid electrolyte 800. Also, if the first roller member 110 is disposed the upper side of the electrode or the solid electrolyte 800, the second roller member 120 may be disposed at the lower side of the electrode or the solid electrolyte 800. In addition, the first roller member 110 and the second roller member 120 may have different diameters. That is, in FIG. 4, the diameter of the first roller member 110 is larger than the diameter of the second roller member 120. However, the present invention is not limited thereto. If the first roller member 110 and the second roller member 120 are provided to have different diameters as above, it is possible to easily press targets even when the targets are different in material or material characteristics. For example, if an electrolyte layer 810 and a negative electrode 820 are joined and pressed together as shown in FIG. 5, the second roller member 120, which is the roller member 100 pressing the electrolyte layer 810, has a relatively small diameter, and the first roller member 110, which is the roller member 100 pressing the negative electrode 820, has a relatively large diameter, which makes it possible to easily join and press different materials. In addition, the electrode or the solid electrolyte 800 may move along a straight path. However, as shown in FIG. 4, it is also possible that the electrode or the solid electrolyte 800 moves along a movement path that is not a straight line.

Meanwhile, referring to FIG. 4, a sensing member 300 and a control unit 400 may be further provided. The sensing member 300 may be provided in various ways to sense a thickness of the electrode or the solid electrolyte 800 for an all-solid-state battery, which is pressed by the plurality of first roller members 110 or the plurality of second roller members 120. Here, one or more sensing members 300 may be provided. In addition, the control unit 400 adjusts the pressing force of the plurality of first roller members 110 or the plurality of second roller members 120 according to the thickness of the electrode or the solid electrolyte 800 sensed by the sensing member 300. For example, after setting a target thickness of the electrode or the solid electrolyte 800, the first roller member 100 may apply a pressure to reduce the thickness to 80% of an initial thickness, and the second roller member 100 may apply a pressure to reduce the thickness to 60% of the initial thickness. The above thickness adjustment may be controlled by the sensing member 300 and the control unit 400. Also, if there is almost no difference between the thickness of the electrode or the solid electrolyte 800 of any one roller member 100 and the thickness of the electrode or the solid electrolyte 800 of another adjacent roller member 100, the roller member 100 may be controlled to release the pressure. In addition, the above method may also be applied to a case where the solid electrolyte and the electrode are joined and pressed.

Figure 6:
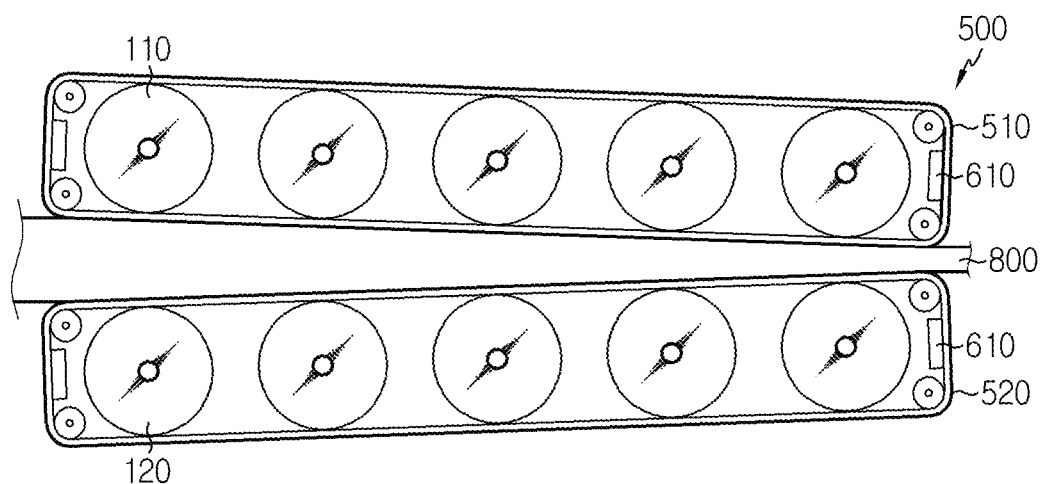
FIG. 6 is a diagram schematically showing an apparatus for manufacturing an electrode or a solid electrolyte for an all-solid-state battery according to the second embodiment of the present disclosure.

FIG. 6 is a diagram schematically showing an apparatus for manufacturing an electrode or a solid electrolyte for an all-solid-state battery according to the second embodiment of the present disclosure.

Hereinafter, the operation and effect of an apparatus 10 for manufacturing an electrode or a solid electrolyte for an all-solid-state battery according to the second embodiment of the present disclosure will be described with reference to the figures, but the features identical to those of the apparatus 10 for manufacturing an electrode or a solid electrolyte for an all-solid-state battery according to the first embodiment of the present disclosure will not be described again.

The second embodiment of the present disclosure is different from the first embodiment in the point that a guide belt 500 is provided to surround the roller members 100 and a heat supply member may be provided.

Referring to FIG. 6, a first guide belt 510 may be provided to entirely surround the plurality of first roller members 110, and a second guide belt 520 may be provided to entirely surround the plurality of second roller members 120. Here, the plurality of first roller members 110 or the plurality of second roller members 120 may have the same thickness or may have different thicknesses from each other. Thus, since the guide belt 500 is provided to surround the roller members 100, the electrode or the solid electrolyte 800 may be uniformly pressed as a whole.

Meanwhile, a first heat supply member 610 may be connected to the first guide belt 510 or the second guide belt 520 to supply heat to the first guide belt 510 or the second guide belt 520. The first heat supply member 610 may be coupled to the guide belt 500 to rotate together with the guide belt 500 or may be connected to the guide belt 500 at the outside of the guide belt 500. The first heat supply member 610 may include various heat sources such as a heater. If heat is supplied to the first guide belt 510 or the second guide belt 520 as above, when the heat is transferred to the electrode or the solid electrolyte 800 through the first guide belt 510 or the second guide belt 520, the heat may be sufficiently transferred due to an elongated contact time, thereby improving the rolling performance of the electrode or the solid electrolyte 800. That is, the heat from the first heat supply member 610 is transferred to the entire guide belt 500 to heat the guide belt 500, and the heat may also be transferred to the electrode or the solid electrolyte 800 in contact with the heated guide belt 500. In addition, if the guide belt 500 is used, the contact area between the guide belt 500 and the electrode or the solid electrolyte 800 is wider than the contact area between the roller member 100 and the electrode or the solid electrolyte 800. Thus, if the guide belt 500 is used, it is possible to transfer sufficient heat to the electrode or the solid electrolyte 800.

Figure 7:
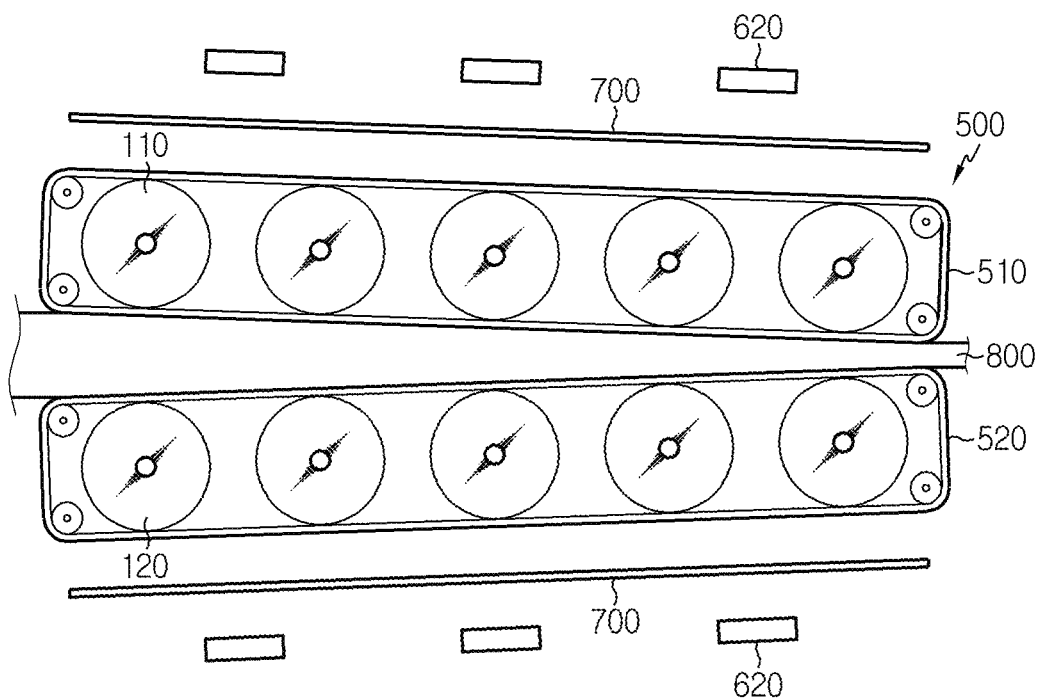
FIG. 7 is a diagram schematically showing an apparatus for manufacturing an electrode or a solid electrolyte for an all-solid-state battery according to the third embodiment of the present disclosure.

FIG. 7 is a diagram schematically showing an apparatus for manufacturing an electrode or a solid electrolyte for an all-solid-state battery according to the third embodiment of the present disclosure.

Hereinafter, the operation and effect of an apparatus 10 for manufacturing an electrode or a solid electrolyte for an all-solid-state battery according to the third embodiment of the present disclosure will be described with reference to the figures, but the features identical to those of the apparatus 10 for manufacturing an electrode or a solid electrolyte for an all-solid-state battery according to the first and second embodiments of the present disclosure will not be described again.

The third embodiment of the present disclosure is different from the first embodiment and the second embodiment in the point that a heat dispersion member 700 is provided.

Referring to FIG. 7, the second heat supply member 620 may be provided to supply heat to the first guide belt 510 or the second guide belt 520 at a location spaced apart from the first guide belt 510 or the second guide belt 520. That is, the second heat supply member 620 supplies heat to the first guide belt 510 or the second guide belt 520 in a non-contact manner. Here, though not shown in FIG. 7, the second heat supply member 620 may be fixed by a bracket or the like or may be supported by a support or the like. The second heat supply member 620 may be provided in various ways and may include, for example, a heater. In addition, at least one second heat supply member 620 may be provided.

If one or more second heat supply members 620 are provided or, for example, if a plurality of second heat supply members 620 are provided, the heat dispersion member 700 is disposed between the second heat supply members 620 and the guide belt 500 and uniformly disperses the heat from the second heat supply member 620 to the guide belt 500. Here, a working fluid may be contained in the heat dispersion member 700. That is, if the heat from the second heat supply member 620 reaches the heat dispersion member, the working fluid inside the heat dispersion member 700 is vaporized. The vaporized working fluid travels from the heat dispersion member 700 to a portion with a relatively low temperature to transfer the heat. As described above, the working fluid circulates in the heat dispersion member 700 to uniformly disperse the heat from the second heat supply member 620 to the guide belt 500. That is, even though the heat provided from the second heat supply member 620 is not uniform, the heat dispersion member 700 may uniformly disperse the heat provided by the second heat supply member 620 to be transferred to the guide belt 500. Accordingly, the guide belt 500 may have a uniform temperature entirely, thereby transferring uniform heat to the electrode or the solid electrolyte 800.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGN

| | |
|---|---|
| 10: | apparatus for manufacturing an electrode or a solid electrolyte for an all-solid-state battery |
| 100: | roller member |
| 110: | first roller member |
| 120: | second roller member |
| 200: | elastic body |
| 300: | sensing member |
| 400: | control unit |
| 500: | guide belt |
| 510: | first guide belt |
| 520: | second guide belt |
| 610: | first heat supply member |
| 620: | second heat supply member |
| 700: | heat dispersion member |
| 800: | electrode or solid electrolyte for an all-solid-state battery |

What is claimed is:

1. An apparatus for manufacturing an electrode or a solid electrolyte for an all-solid-state battery, the apparatus comprising:
   a first roller member configured to press an electrode or a solid electrolyte for an all-solid-state battery;
   a second roller member located to be spaced apart from the first roller member to press the electrode or the solid electrolyte for an all-solid-state battery, wherein the first roller member and the second roller member are disposed at opposite locations based on the electrode or the solid electrolyte for an all-solid-state battery, the first roller member and the second roller member are provided in plural, respectively, the plurality of first roller members are disposed to be spaced apart from each other along one straight line, and the plurality of second roller members are disposed to be spaced apart from each other along another straight line;
   a first guide belt configured to entirely surround the plurality of the first roller members or a second guide belt configured to entirely surround the plurality of the second roller members;
   a plurality of second heat supply members spaced apart from one another and spaced apart from the first guide belt or the second guide belt to supply heat to the first guide belt or the second guide belt in a non-contact manner; and
   a heat dispersion member disposed between the plurality of second heat supply members and the first guide belt or the second guide belt to uniformly disperse the heat supplied from the plurality of second heat supply members.

2. The apparatus for manufacturing an electrode or a solid electrolyte for an all-solid-state battery according to claim 1, wherein the plurality of the first roller members disposed to be spaced apart from each other along the one straight line are provided to have different diameters from each other, or the plurality of the second roller members disposed to be spaced apart from each other along the another straight line are provided to have different diameters from each other.

3. The apparatus for manufacturing an electrode or a solid electrolyte for an all-solid-state battery according to claim 2, wherein the plurality of the first roller members or the plurality of the second roller members are provided such that the diameters of the first roller members or the second roller members become smaller in a preset direction.

4. The apparatus for manufacturing an electrode or a solid electrolyte for an all-solid-state battery according to claim 1, further comprising:
   a first heat supply member connected to the first guide belt or the second guide belt to supply heat to the first guide belt or the second guide belt.

5. The apparatus for manufacturing an electrode or a solid electrolyte for an all-solid-state battery according to claim 1, further comprising:
   an elastic body configured to surround the first roller member or the second roller member.

6. The apparatus for manufacturing an electrode or a solid electrolyte for an all-solid-state battery according to claim 1, further comprising:
   at least one sensing member configured to sense a thickness of the electrode or the solid electrolyte for an all-solid-state battery, which is pressed by the plurality of the first roller members or the plurality of the second roller members; and
   a control unit configured to adjust a pressing force of the plurality of the first roller members or the plurality of the second roller members according to the thickness of the electrode or the solid electrolyte sensed by the sensing member.

7. The apparatus for manufacturing an electrode or a solid electrolyte for an all-solid-state battery according to claim 1, wherein the heat dispersion member is spaced apart from the first guide belt or the second guide belt to supply heat to the first guide belt or the second guide belt in a non-contact manner.

8. The apparatus for manufacturing an electrode or a solid electrolyte for an all-solid-state battery according to claim 1, wherein the heat dispersion member contains a working fluid that is configured to circulate in the heat dispersion member to uniformly disperse the heat from the plurality of second heat supply members.

* * * * *